United States Patent [19]

Nalbach

[11] 3,948,386

[45] Apr. 6, 1976

[54] APPARATUS FOR ORIENTING AND FEEDING ARTICLES

[75] Inventor: John C. Nalbach, Jersey City, N.J.

[73] Assignee: Colgate-Palmolive Company, New York, N.Y.

[22] Filed: Dec. 5, 1973

[21] Appl. No.: 421,809

Related U.S. Application Data

[63] Continuation of Ser. No. 247,498, April 25, 1972, which is a continuation of Ser. No. 840,739, July 10, 1969, Pat. No. 3,662,782.

[52] U.S. Cl. ............................... 198/287; 221/171
[51] Int. Cl.² ........................................ B65G 47/14
[58] Field of Search .... 198/136, 287; 193/13, 31 A; 221/171, 172, 160

[56] References Cited
UNITED STATES PATENTS 2,941,652  6/1960  Miller............................ 198/33 AA

FOREIGN PATENTS OR APPLICATIONS 1,024,730  4/1966  United Kingdom............ 198/33 AA Primary Examiner—Evon C. Blunk
Assistant Examiner—Douglas D. Watts
Attorney, Agent, or Firm—Strauch, Nolan, Neale, Nies & Kurz

[57] ABSTRACT

Apparatus for orienting and feeding lightweight plastic bottles or the like having a rotating bowl in which a supply of randomly arranged bottles is placed, a plurality of chutes spaced around the bowl for rotation therewith, with each chute having a bottle receiving opening at the upper edge of the bowl. A plurality of vertically reciprocable bottle pushers are mounted within the bowl and rotate therewith, each pusher being operatively associated with one of the chutes. As the bowl rotates, each pusher moves a bottle up a stationary helical discharge track from the top of which the bottles are deposited in a predetermined oriented position into the respective associated chute, with the bottle eventually being transferred onto a linear conveyor which is arranged along a tangent to the path of rotation of the bottles as they are positioned in the rotating chutes.

2 Claims, 13 Drawing Figures

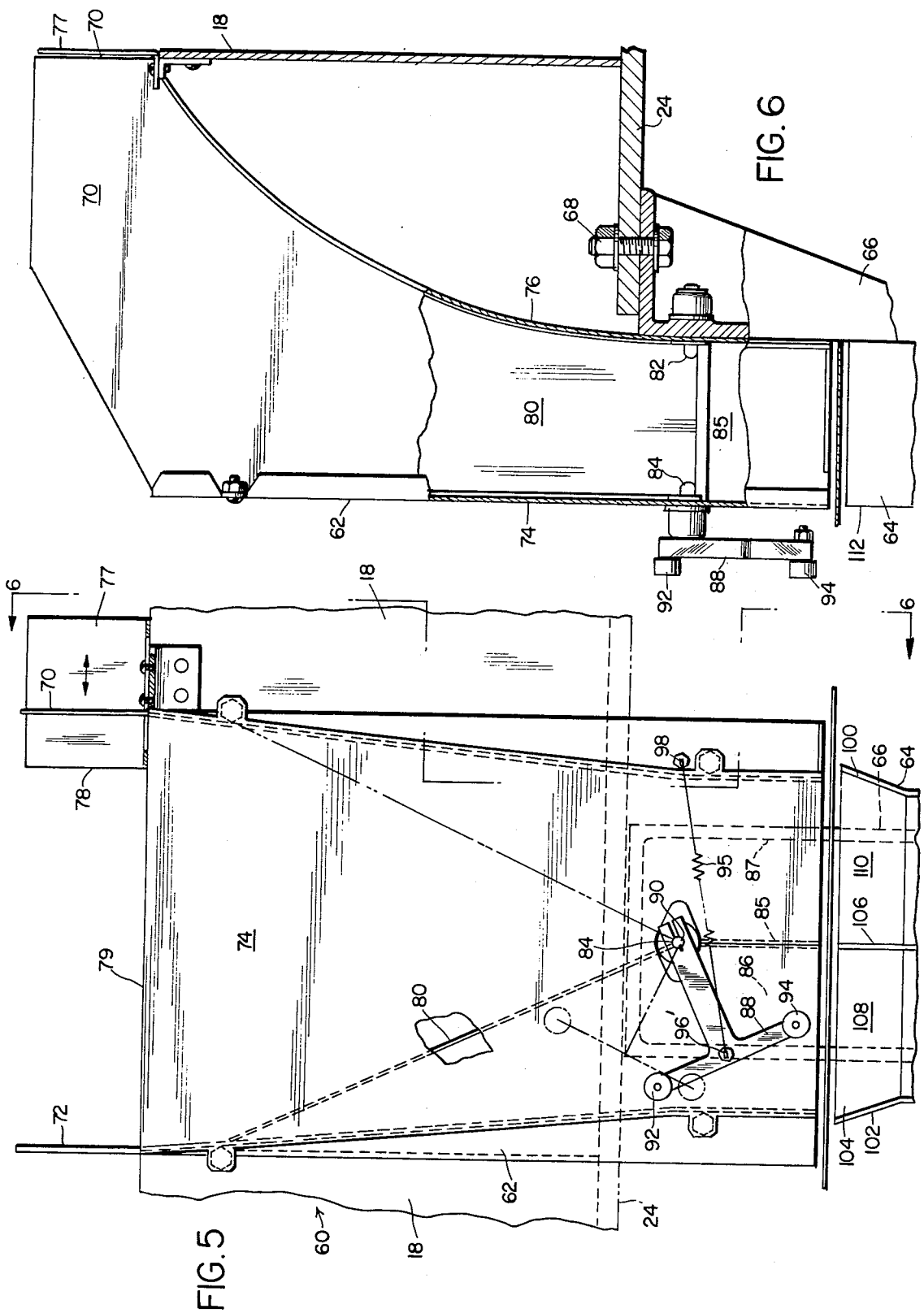

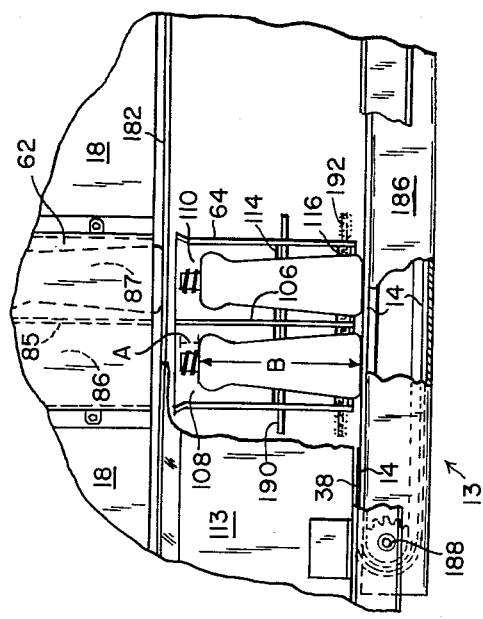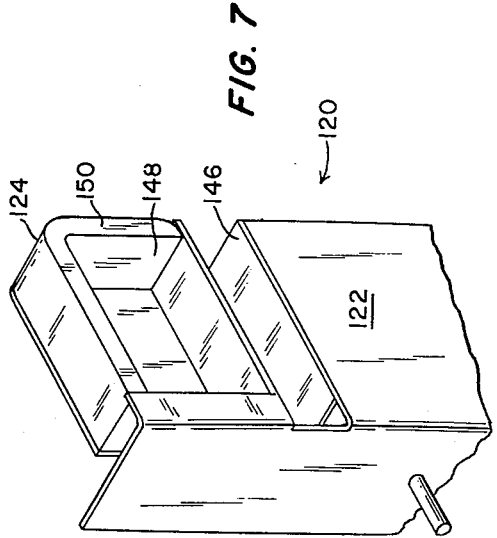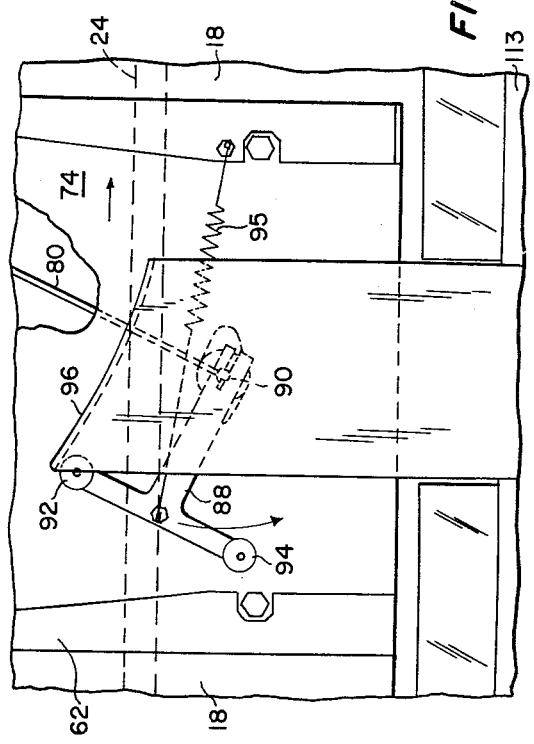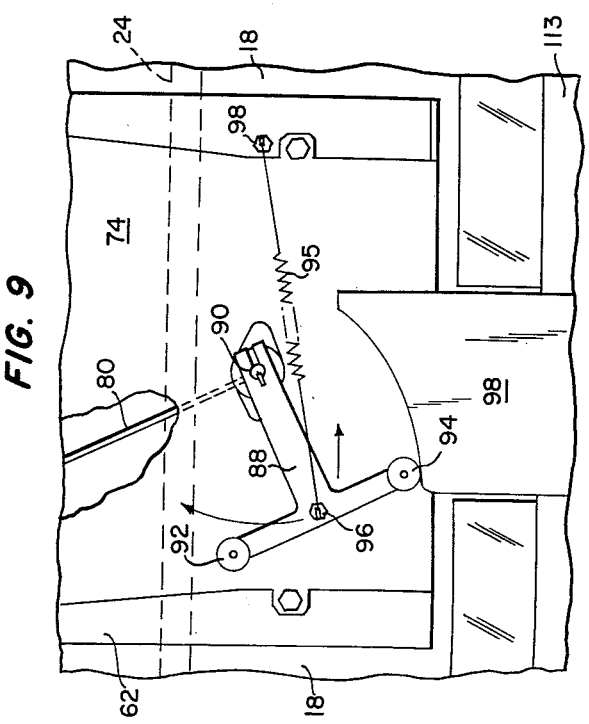

APPARATUS FOR ORIENTING AND FEEDING ARTICLES

This is a continuation of application Ser. No. 247,498, filed Apr. 25, 1972 which is a continuation of Ser. No. 840,739 filed July 10, 1969, U.S. Pat. No. 3,662,782.

BACKGROUND OF THE INVENTION

This invention relates generally to apparatus for automatically sorting and feeding articles in a desired orientation, and more particularly to automatic material handling apparatus for feeding articles such as lightweight, plastic bottles in a predetermined oriented upright position to a desired processing location.

In the past, the arranging of bottles into a predetermined position or orientation before feeding them to a desired location such as bottle filling station has involved a great deal of manual handling and manipulation of the bottles. Consequently, it has not been possible to uniformly orient all the bottles to the same position nor to feed them at a substantially uniform predetermined rate. Additionally, several persons have been necessarily employed to arrange the bottles in order to provide a sufficiently high rate of feed required by the automatic bottle filling equipment. These combined factors have produced inefficient and unpredictable production schedules and resulted in higher operating costs.

Prior attempts to solve the problems associated with manual handling systems by providing apparatus capable of automatically sorting and feeding the bottles have not been entirely successful, especially when handling lightweight, readily bounceable plastic bottles. Known automatic feeder equipment, which usually has been quite expensive and complicated in structure generally has been unsuitable for use with such plastic bottles because of their inability to gently handle and positively control the bottles at all times while positioning them in a predetermined orientation. Hence, the bottles are not discharged from the feeder in a uniform, properly arranged position. In addition, known bottle feeders are limited in capacity, provide only relatively low feed rates, and are not very readily adaptable for operation with various sized and shaped bottles.

SUMMARY OF THE INVENTION

Accordingly, the primary object of this invention resides in the provision of novel apparatus for automatically orienting and feeding articles in a uniformly stabilized position at a desired rate of feed.

Another object resides in the provision of novel automatic orienting and feed apparatus particularly useful with lightweight plastic bottles or the like which are initially randomly arranged, the apparatus uniformly orienting such bottles in a predetermined fashion and feeding the bottles in such uniform orientation at a high rate of feed to a desired location.

Still another object resides in the provision of a novel orienting and feed apparatus especially useful with lightweight plastic bottles, the apparatus being highly versatile and capable of gently handling bottles of various sizes and dimensions to uniformly orient and stabilize the bottles in a predetermined upright position for transfer to a desired location.

Another object resides in the provision of a novel orienting and feed apparatus which gently handles and positively controls movement of the bottles while orienting and transferring them in a stabilized upright position onto a linear transfer conveyor.

A further object resides in the provision of a novel orienting and feed apparatus especially useful with lightweight, plastic bottles comprising a rotating hopper or bowl into which a random supply of bottles is placed, a plurality of discharge chutes spaced around the bowl for rotation therewith, a plurality of bottle pushers connected to the bowl for rotation therewith, the pushers being mounted for vertical reciprocation relative to the wall of the bowl, and stationary, peripherally arranged, helical discharge tracks providing a discharge path for bottles from the bowl. As the bowl rotates, each pusher may move a bottle up a track and deposit it bottom-end down into an associated chute.

The apparatus further includes a linear conveyer arranged underneath the chutes along a tangent to the circular path of movement of the bottles in the chutes for receiving the bottles and transferring them to the desired location. To insure stabilization of the bottles, the rotational speed of the bowl and chutes and the linear speed of the transfer conveyor are synchronized to provide a smooth and steady transfer of the bottles away from the feed apparatus.

Still another object of the invention resides in the provision of the above described apparatus in which each of the bottles moved up the discharge track is properly deposited bottom-end down into a chute, regardless of whether its neck or bottom end engages the pusher moving it up the track.

A still further object of the invention resides in the provision of the above described apparatus in which the bottles from one of the discharge tracks after being deposited in the chutes is moved completely around the apparatus before being placed on the linear conveyor to insure stabilization of the lightweight bottle during transfer onto the conveyor.

Another object resides in a provision of the above described apparatus including a novel chute structure having separate compartments therein selectively receiving a bottle from one or the other of the discharge tracks, and an adjustable cam operated, pivotable diverter flap selectively positioned as the chute rotates with the bowl to direct a bottle received from each of the tracks into a selected one of the chute compartments.

Still another object resides in the provision of the above described apparatus including common variable speed drive means for the bowl and linear conveyor, the drive means causing the velocity of the linear conveyor and the tangential velocity of the bottles within the chutes to be equal so that the bottles can be gently transferred to the linear conveyor in a steady stabilized condition. The variable drive means also enables the apparatus to sort and feed the properly oriented bottles at a variable rate depending upon the requirements of the process equipment to which they are eventually transferred.

Other objects and advantages will become more readily apparent from the following description of the preferred embodiment as related to the accompanying drawings. However, the description is given for illustrative purposes only and without any intent of limiting the invention to the specific details shown or described therein.

BRIEF DESCRIPTION OF THE DRAWINGS

FIG. 5 is a fragmentary rear elevation view taken along line 5—5 of FIG. 3 and illustrating the compartmented chute and the article diverter flap and its cam operated mechanism;

FIG. 6 is a fragmentary sectional elevation view taken along line 6—6 of FIG. 5;

FIG. 7 is an enlarged perspective view of the bottle-engaging head portion of the bottle pushers shown in FIG. 2A;

FIG. 8 is a fragmentary side elevation taken along line 8—8 of FIG. 3 and illustrating the transfer station including the linear transfer conveyor;

FIG. 9 is a fragmentary view taken along line 9—9 of FIG. 3 illustrating the cam mechanism for moving the article diverter flap within the chute to one of its end positions;

FIG. 10 is a fragmentary view taken along line 10—10 of FIG. 3 illustrating the cam mechanism for moving the article diverter flap within the chute to its other end position;

DETAILED DESCRIPTION OF THE INVENTION

Figure 1:
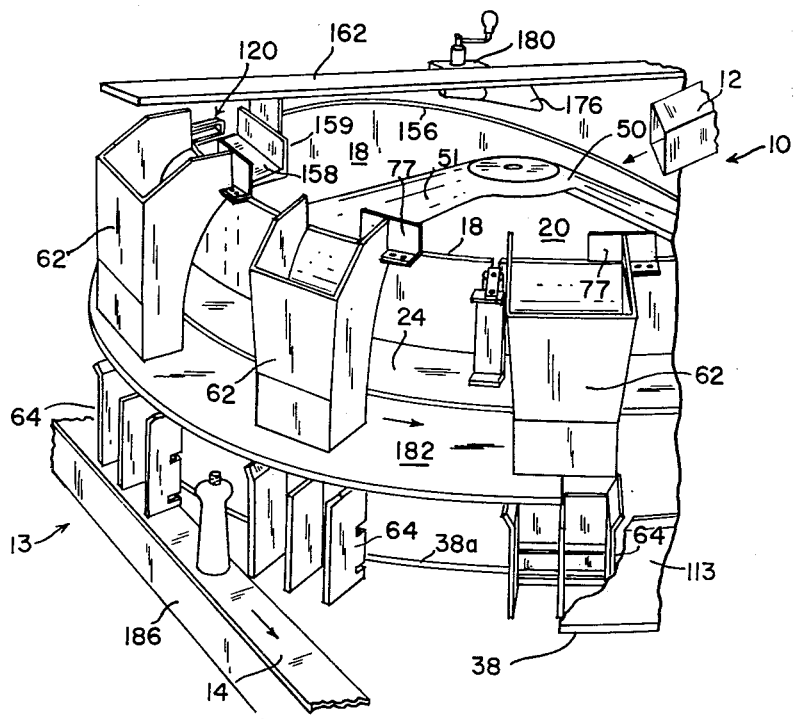
FIG. 1 is a generally perspective view of the orienting and feed apparatus of the invention.

Referring now to FIG. 1 of the drawings, the orienting and feed apparatus of the invention comprises a rotating cylindrical hopper assembly 10 into which a random supply of bottles is placed by dump mechanism 12, with hopper assembly 10 being operative to orient and discharge the bottles in an upright position at transfer station 13 onto a linear endless belt conveyor 14 which delivers the bottles all uniformly arranged in a predetermined upright position to a further processing station such as a bottle filling machine, not shown.

Figure 2A:
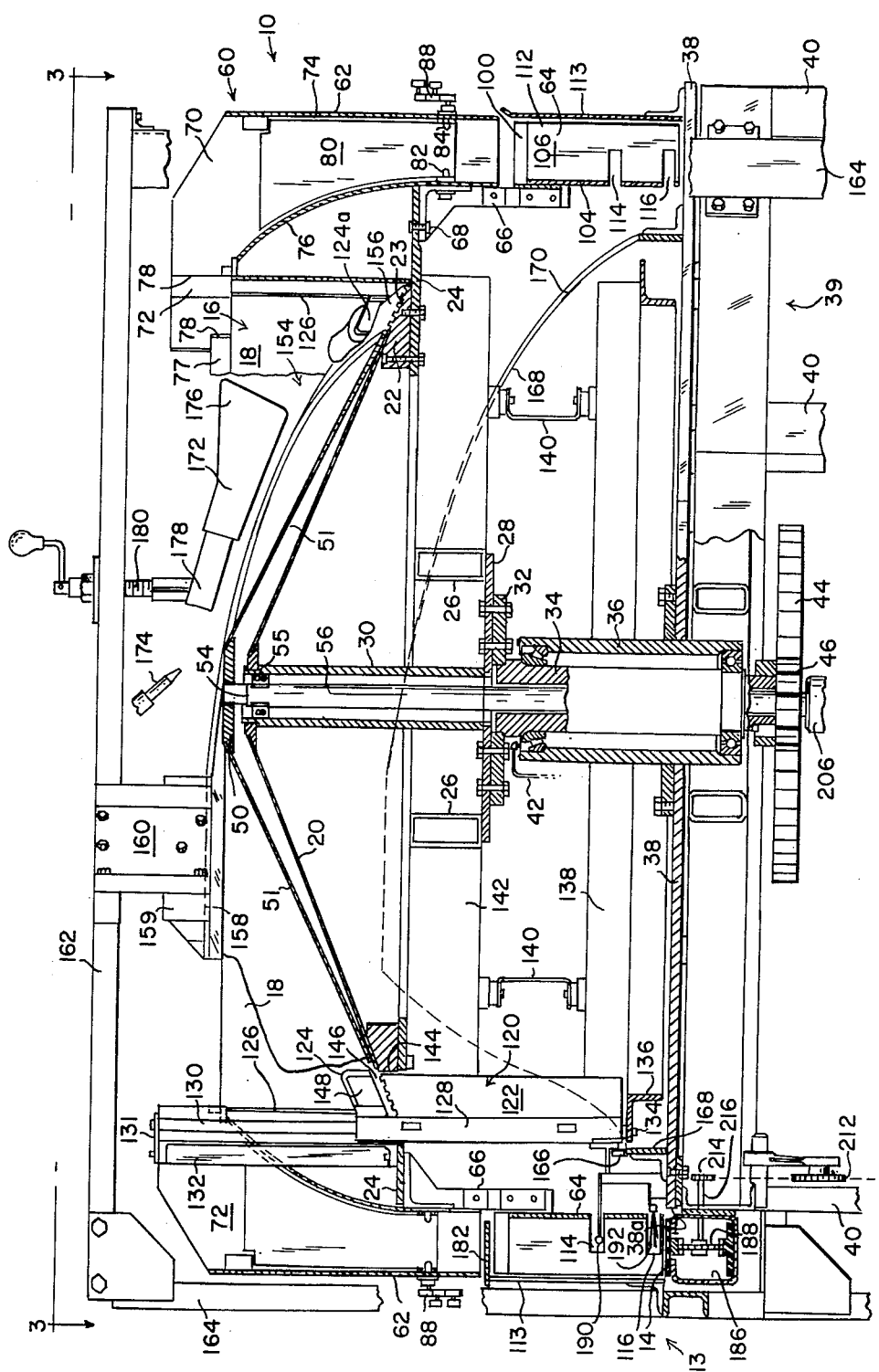
FIG. 2A is a fragmentary section elevation view taken along line 2A—2A of FIG. 3 illustrating the rotating bowl, bottle pushers, and discharge chutes and their relation to the stationary discharge tracks positioned within the bowl.

As shown in FIG. 2A, hopper assembly 10 comprises bowl 16 formed by cylindrical side wall 18 and conical bottom wall terminating at its lower end in annular plate 22, the upper surface of which is inclined to coincide with the slope of cone 20 terminating at its lower end in annular plate 22, the upper surface of which is inclined to coincide with the slope of cone 20 and has a series of annular rooves 23 for a purpose to be described. Wall 18 and plate 22 are mounted on circular support ring 24 mounted on crossbeams 26 resting on upper mounting plate 28 centrally welded to the lower end of an upper hollow rotating shaft 30 and bolted to lower mounting plate 32 which is centrally welded to a lower hollow rotating shaft 34.

Shaft 34 is bearing supported within a cylindrical casing 36 that is fixedly mounted on stationary circular base plate 38 having cutout section 38a in the area of transfer station 13, the base plate being supported from the floor by a main frame 39 including a plurality of spaced upright posts 40. A lubricant fitting 42 is provided for lubricating the bearing supports for shaft 34.

The upper end of cone 20 is connected to the upper end of shaft 30 for rotation therewith.

Figures 2B, 4:
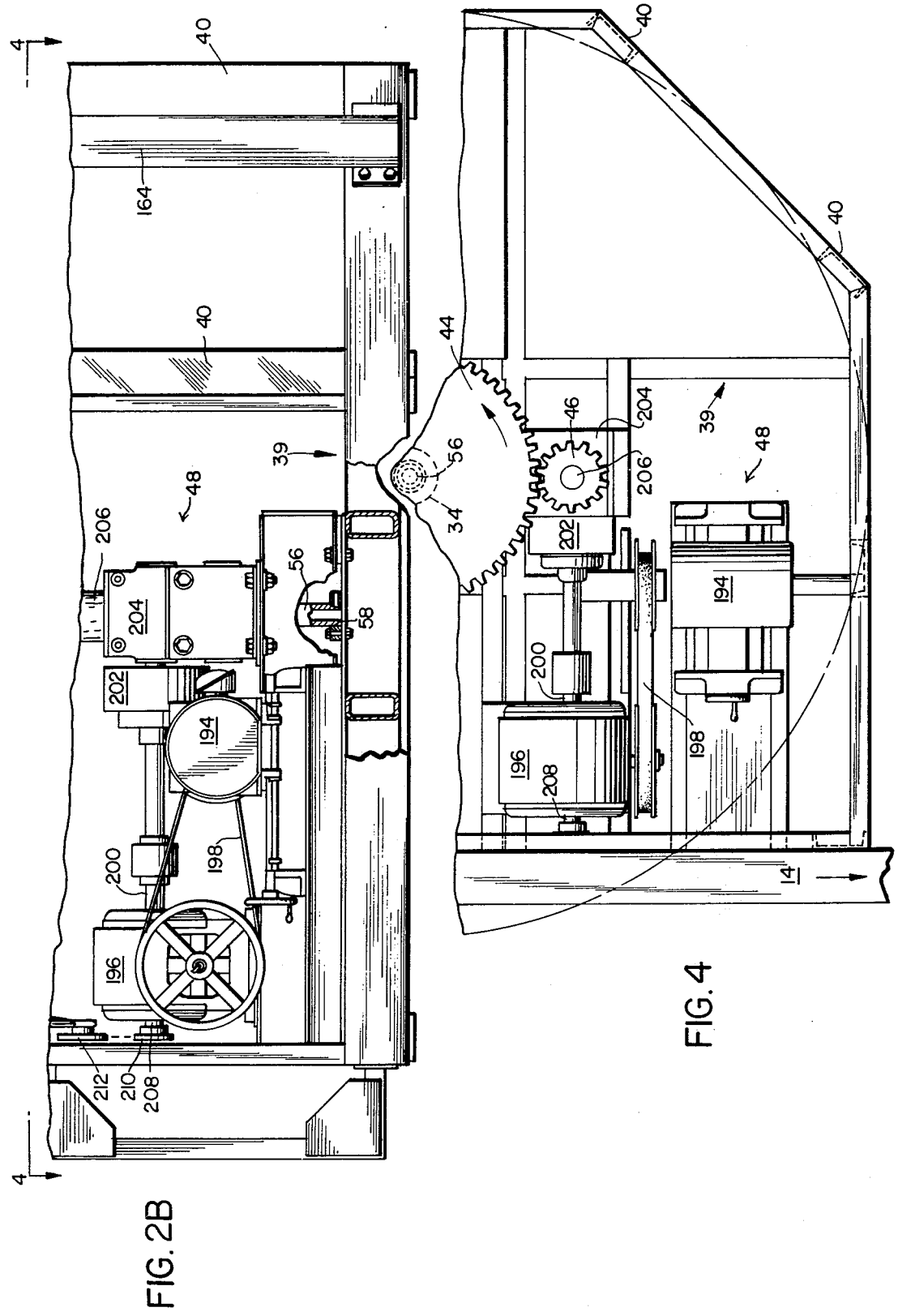
FIG. 2B is a fragmentary section elevation view illustrating the drive assembly for rotating the bowl and moving the linear transfer conveyor.
FIG. 4 is a fragmentary plan view taken along line 4—4 of FIG. 2B.

The lower end of shaft 34 has spur gear 44 keyed thereon, with gear 44 being driven through pinion gear 46 by drive assembly 48 illustrated in FIGS. 2B and 4.

A stationary cone shaped member 50 (FIGS. 2A and 3) having opposed sections 51 with smoothly inclined forward edges 52 overlies a part of rotating cone 20 and is fixed to the upper end 54 of stationary shaft 56 which is centered within rotating shaft 30 by bearings 55 and extends downwardly through rotating shafts 30 and 34 and is fixed at its lower end 58 to main frame 39 (FIG. 2B).

A plurality of 12 bottle discharge chutes 60 are equally spaced around the outer edge of wall 18 and have vertically spaced, aligned upper and lower chute sections 62 and 64 which are connected together by inside bracket 66, the upper end of which is connected to support ring 24 for rotation therewith by bolt assemblies 68.

As illustrated in FIGS. 2A, 5 and 6, chute section 62 is formed by a pair of side panels 70 and 72 which extend above the top edge of wall 18, a back panel 74, and a curved front panel 76 the upper edge of which is fixed adjacent to and aligns with the top edge of wall 18. An adjustable plate 77 is mounted on wall 18 for sliding movement in front of the upper edge of side panel 70 and has an inner edge 78 which along with the upper edges of panels 72 and 74 define a front opening 79 through which bottles are deposited into the chute.

Upper section 62 has a pivotal diverter flap 80 centrally pivotally supported therein from the lower end of panels 74 and 76 by bearing pins 82 and 84 and also has a fixed central plate 85 extending between panels 74 and 76 vertically below the pivot axis of flap 80 to the open bottom of section 62. A T-shaped cam follower 88 is fixed at 90 to the outer end of bearing pin 84 and includes a pair of cam rollers 92 and 94 actuated respectively by downwardly sloping cam 96 (FIGS. 3 and 10) and upwardly sloping cam 98 (FIGS. 3 and 9) to selectively position flap 80 at one of its end positions and thereby direct a bottle through one or the other of passages 86 or 87 at the sides of plate 85. An over-center tension spring 95 is connected at one end 96 to follower 88 and at the other end 98 to side panel 70 and functions to snap flap 80 to its end position when follower 88 has been cam actuated a predetermined distance.

Figure 3:
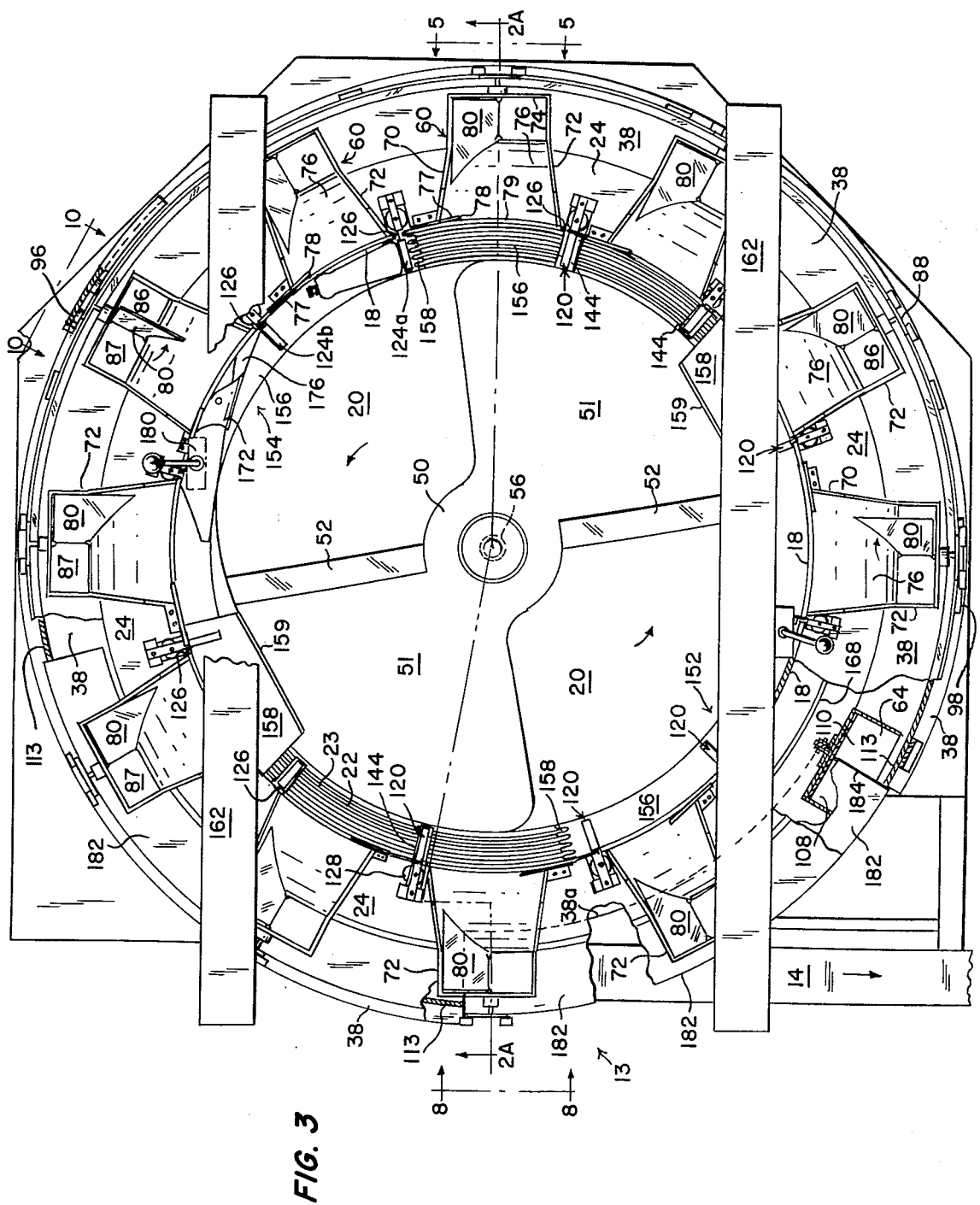
FIG. 3 is a fragmentary plan view taken along line 3—3 of FIG. 2A.

Lower chute section 64 includes a pair of sidewalls 100 and 102, an innerwall 104 and central divider plate 106 vertically aligned with plate 85 to provide two compartments 108 and 110 within section 64. The outer face 112 of section 64 is open to permit transfer of the bottles in compartments 108 and 110 onto conveyor 14 at transfer station 13. However, as shown in FIGS. 2A and 3, a stationary upright circular closure plate 113 fixed to base plate 38 extends around the outside of sections 64 to enclose the bottles therein, with the plate being discontinued throughout the cutout section 38a of base 38 in the area of transfer station 13 to permit the bottles to be transferred off base 38 onto conveyor 14. A pair of spaced, inwardly facing grooves 114 and 116 are provided in sections 64 to assist in orientation of the bottle during transfer of the bottles from compartments 108 and 110 onto conveyor 14.

With continued reference to FIGS. 2A and 3, removal of bottles from bowl 16 is accomplished by a plurality of twelve pushers 120 each located immediately adjacent a chute 60, with the pusher rotating with bowl 16 and also reciprocating vertically relative to walls 18 and 20, each pusher comprising a lowerguide portion 122 spaced from an inclined hollow head portion 124, with the guide and head portions extending outwardly through a vertical slot 126 in wall 18 and being connected to bearing sleeve 128 vertically slidably mounted on rod 130 fixed at its upper end 131 to bracket 132 mounted on support ring 24 and at its lower end 134 to chanel ring 136. Ring 136 is suspended from support ring 24 by interconnected channel members 138, 140 and 142.

Guide 122 and sleeve 128 reciprocate in slot 144 extending through a support ring 24 and annular ring 22, the guide having its upper end inclined parallel to the spaced lower end of pusher head 124 to provide an inclined groove 146 generally coinciding with the slope of cone 20.

As shown in FIG. 7, the hollow pusher head portion 124 has a front opening 148 defined by the surrounding wall face 150 and dimensioned to receive the narrow cap or neck portion A, (FIG. 8) of a bottle but not large enough to receive any part of the enlarged body portion B of the same bottle. As is evident in FIG. 3, front wall face 150 is aligned with the edge of panel 72 of upper chute section 62. Also, the spacing between adjacent pusher heads 124 is sufficient to permit only a single bottle lying in a proper horizontal position to be located therein.

In order to convey the bottles from the lower periphery of bowl 16 into chutes 60, a pair of identical stationary discharge stations 152 and 154 are provided with the stations spaced approximately 180° from each other around the bowl. As shown best in FIGS. 2A and 3, each station comprises a stationary track 156 which, at its lower end, has a plurality of fingers 158 riding in ring grooves 23 and extends helically upwardly in engagement with wall 18 for approximately 120° to an upper discharge platform 158 having an outer wall 159 and an inner edge level with the top of wall 18. Platform wall 159 is connected by bracket 160 to stationary frame members 162 and 164. Track 156 and platform 158 have a thickness less than the height of groove 146 and are sloped toward wall 18 so that the bottles are pushed up the track in a horizontal position by pusher heads 124 in engagement with wall 18 and, when they reach platform 158, are deposited by gravity into chute 60 associated with the respective bottle pusher.

Each pusher 120 includes at its lower end a cam follower roller 166 which rides on a 360° cam 168 designed to vertically reciprocate pusher 120 and enable it to move the bottles up track 156 at each of stations 152 and 154. As shown in FIG. 2A with respect to discharge station 154, the contour of pusher cam face 170 follows the contour of track 156 and causes the pusher to rise, with track 156 being positioned within groove 146 as shown with respect to pusher heads 124a and 124b moving up the track. Upon passing the discharge platform 158, the pusher will drop rapidly on cam face 170 to its lowermost position shown at the left of FIG. 2A in which it is again ready to rise when it reaches station 152.

Each of the stations 152 and 154 may include suitable sorting devices such as a plow 172 and/or air nozzle 174 to insure that only bottles arranged in a predetermined horizontal position on discharge track 156 are allowed to pass to platform 158. The inner end 176 of plow 172 is spring biased into contact with wall 18 and curves outwardly over track 156. The other plow end 178 is connected to a feed screw 180 mounted on frame member 162. The plow is normally vertically adjusted by screw 180 above track 156 to permit only one bottle engaged by a pusher 124 and lying in the predetermined horizontal position to pass thereunder. If bottles should become stacked one upon the other, plow 176 will direct all but the lowermost bottle off track 156 and back into bowl 16.

As shown in FIGS. 2A, 3, and 8, the bottles which are deposited bottom-down into one side of upper chute section 62 at discharge station 154 do not pass directly down into lower chute section 54, but rather land on a stationary circular smooth surface shelf 182 supported on closure plate 113 and extending between the upper and lower chute sections in the region of transfer station 13. The use of shelf 182 functions to sufficiently steady and stabilize the bottles from station 154 before they are placed on conveyor 14. For example, if shelf 182 were not employed, the lightweight bounceable bottles would be deposited directly into lower chute section 64 from platform 158 of station 154 and would only be moved with bowl 16 through an angular distance of about 60° before being transferred to conveyor 14. Such limited annular movement for practical sized machines has been found to be insufficient to stabilize the bottles. Hence, shelf 182 causes these bottles to be moved through an angular distance greater than one revolution of the bowl, since the bottles are first moved across shelf 182 to shelf end 184 from whence they drop into a compartment 110 of lower chute section 64 and are then moved across the smooth surface of base 38 around the machine as the bowl and chutes rotate until they are placed on conveyor 14.

However, the bottles discharged from bowl 16 at station 152 drop directly through upper chute section 62 down into lower section 64, since these bottles will travel across base 38 around the machine through an angular distance of about 250° before reaching conveyor 14. This distance of angular travel has been found to be sufficient to stabilize and position the bottles before transfer.

At transfer station 13, the bottles in the lower chute section 64 are transferred onto linear conveyor 14 which moves underneath the chute section along a path tangent to the circular path of movement of the chutes and the bottles therein. As shown in FIGS. 2A, 3, and 8, and as mentioned above, base 38 is cut away at section 38a to permit transfer of the bottles therefrom onto the upper section of the conveyor belt. Belt 14 is guided and steadied in a channel track 186 and is positively driven by sprocket 188 from drive assembly 48 so that its linear velocity is substantially equal to the tangential velocity of the bottles within chute section 64 to provide a smooth transfer of the bottles onto conveyor 14. To assist in this transfer, a stationary part-circular guide rail 190 extends into groove 114 and a stationary brush 192 extends into groove 116, the rail and brush being mounted on base 38. These elements urge the bottles in chute section 64 to the outermost portion of the chute while at the same time uniformly orient all the bottles in the same position on conveyor 14.

Referring now to FIGS. 2B and 4, drive assembly 48 mounted on frame 39 comprises a variable speed motor 194 connected to gear reducer 196 by belt 198. Reducer 196 has one output shaft 200 connected through overload clutch 202 to a right angle drive gear box 204 having an output shaft 206 on which is keyed pinion gear 46 which drives the spur gear 44 to rotate bowl 16, chutes 60 and pushers 120 together.

Reducer 196 has a second output shaft 208 having an end sprocket 210 chain drive connected to sprocket 212 mounted on a frame post 40, sprocket 212 being further chain drive connected to a sprocket 214 fixed on one end of shaft 216, on the other end of which the main conveyor drive sprocket 188 is fixed.

The drive assembly 48 and respective drive elements are sized and adjusted so that the linear speed of transfer conveyor 14 is substantially equal to the tangential velocity of the bottles in lower chute sections 64 as described above.

The invention will be best understood from a description of a typical operation of the bottle orienting and feed apparatus.

Initially, plate 77 of each chute 60 is adjusted so that the length of opening 79 is substantially equal to the length of the body portion B of the bottles being handled, i.e., as shown in FIG. 8, the total length of the bottle minus the narrow neck or cap portion A on which a closure cap is ordinarily placed. Drive assembly 48 is also adjusted to provide a desired rate of feed of the bottles.

In operation, bottles are dumped from the dump mechanism 12 into the bowl 16 in random orientation, and will fall by gravity down the conical walls 20 and 51 to the lower peripheral edge of the bowl. As bowl 16 is rotated, in the region of sections 51 each pusher head 124 will engage a bottle and move it around a circular path to one of the discharge stations 152 and 154.

Assuming a pusher head 124 and a bottle engaged thereby are approaching station 154, when the lower end of track 156 is reached, the pusher roller 166 will begin to ride up the cam surface 170 so that pusher head 124 and the bottle begin to move up track 156 which then will be positioned within groove 146. If the bottle is properly oriented, that is, it is lying on its front or back in a horizontal position on track 156 with its side in engagement with wall 18 and with either its narrow neck received within pusher head opening 148 or its bottom end contacting the head wall face 150 as shown, for example, against pusher head 124a in FIG. 3, the bottle will pass underneath plow 176 up track 156 to discharge platform 158 from which it falls by gravity into front opening 79 of the associated chute section 62 in a bottom-end-down position. As indicated above, pusher head 124 and plate 77 cooperate to insure that the bottles are deposited into the chute in bottom-down position regardless of whether the bottle has its neck received within pusher head 124 or its bottom end engaging pusher face 150 as it is moved up track 156.

Figure 11:
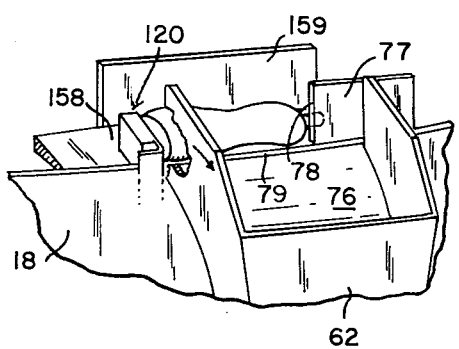
FIG. 11 is a schematic perspective view illustrating deposition of a bottle bottom-end down into a chute from a discharge track, the bottle having been moved up the track with its larger bottom end engaging the pusher.

As illustrated schematically in FIG. 11 in which the bottom end of the bottle engages pusher face 150, as the bottle reaches discharge platform 158, the narrow neck portion will be lying in engagement with the inside face of plate 77 and, due to the inclination of platform 158, the bottle will pivot about plate edge 79, thus causing the bottom end to fall by gravity into the chute.

Figure 12:
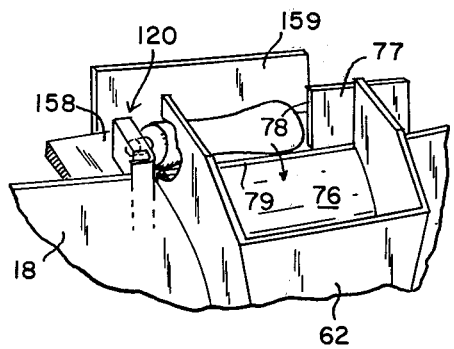
FIG. 12 is a schematic perspective view similar to FIG. 11, with the bottle, however, having been moved up the track with its narrow neck portion received within the pusher.

However, as shown schematically in FIG. 12 in which a bottle moving up track 156 has it neck received through opening 148 within hollow pusher head 124, upon reaching the inclined discharge platform 158, the bottle will pivot about pusher head 124 and will fall bottom down into chute section 62.

Any bottles which are not properly positioned on track 156 as above described will be removed from the track by plow 172 and nozzle 174 and deposited back onto the conical members 20 within the bowl and again picked up by other pushers. It should be noted at this point that the stationary conical members 51 do not extend over cone 20 within the general region of plows 172 so that any bottles redeposited back into the bowl immediately contact rotating cone 20 and are carried away from the discharge stations 152 and 154 to prevent any undesirable bottle buildup within the bowl in these areas.

At station 154, with the flap member 80 first positioned as shown in FIG. 3 and in full in FIG. 5, the bottle will pass downwardly through chute section 62 through passage 87 and will land on the top surface of stationary shelf 182. As the bowl and chutes continue to rotate, this bottle will be moved across shelf 182 over the transfer station 13 until shelf end 184 is reached at which point the bottle will drop down into compartment 110 of lower chute section 64.

As soon as pusher head 124 leaves discharge platform 158, it drops rapidly along cam surface 170 to its lowermost position shown in the left in FIG. 2A where it again engages a bottle and moves it toward discharge station 152.

When the bottle from station 154 has dropped down into lower compartment 110 and, with the bowl and chute continuing to rotate, diverter flap 80 will be moved from its first end position wherein it engages side panel 72 to its other end position in engagement with side panel 70 by contactive engagement of follower roller 94 with cam 98 as shown in FIGS. 3 and 9 and with subsequent aid of over-center spring 95. As the chute then passes discharge platform 158 of station 152, a bottle will be deposited through opening 79 of chute section 62 with its bottom down in the same manner described above. This bottle however will pass downwardly through chute passage 86 of upper chute section 62 and will drop directly down into compartment 108 of lower section 64 onto the surface of base plate 38. As the chute continues to rotate with bowl 16, the bottles in compartments 108 and 110 will be moved across base plate 38 to transfer station 13. However, before the chute again reaches discharge platform 158 of station 154, diverter flap 80 will be returned to its first end position when cam roller 92 engages the bottom cam surface of cam 96 as shown in FIGS. 3 and 10. The operation of cams 96 and 98 insures that the bottles deposited into chutes 60 from station 154 will always pass downwardly through passage 87 of upper chute section 62 and eventually into lower chute compartment 110, while those from station 152 pass through passage 86 into compartment 108.

As shown in FIGS. 2A, 3, and 8, when lower section 64 reaches transfer station 13, the bottles contained in compartments 108 and 110 gently slide off base 38 onto linear conveyor 14 which, as indicated previously, has a linear velocity substantially equal to the tangential velocity of the bottles contained within section 64. As the bottles are placed on conveyor 14, they are also engaged by guide rod 190 and brush 192 which properly orient and uniformly position them on the conveyor so that all the bottles will be in substantially the same position as they are carried off on conveyor 14 to the bottle filling station.

As the emptied lower chute section 64 continues to move in a rotational path and leaves transfer station 13, it is then ready to again receive in compartment 110 a bottle from the shelf end 184 and subsequently to receive a bottle in compartment 108 from the platform 158 of discharge station 152.

It is apparent that the above described embodiment of the invention provides a bottle feeding and orienting mechanism capable of feeding bottles to a desired location at a high and predictable rate of feed with all of the bottles being properly arranged in a predetermined uniform orientation. For example, apparatus constructed in accordance with the invention can reasonably be expected to feed about 170 bottles per minute to a filling station. Furthermore, another variation of the invention in which two identical machines feed onto a common linear transfer conveyor such as conveyor 14 can approximately double this rate of feed to about 350 bottles per minute if such a rate is required.

Among the significant features contributing to the rates of feed which may be obtained with the apparatus of the invention is the fact that a bottle may be discharged from each platform 158 in the desired bottom-down position irrespective of whether or not the bottle has ascended track 156 with either its neck or its bottom end facing pusher head 124.

Also, the provision of a pair of discharge stations within a single bowl 16 and the novel structure of chutes 60 aid in obtaining increased rates of feed, since with each revolution of rotation, lower chute section 64 is able to simultaneously transfer two bottles onto the linear take-off conveyor 14 and thereby effectively double the rate output over a machine which did not employ these features.

Because the bottles, after being deposited in chutes 60, travel through a sufficient angular distance around the machine before they are transferred onto conveyor 14, they are resting in a stable upright position when placed on conveyor 14 and carried away to the next work station. The smooth bottle transfer from the surface of the base 38 onto the conveyor at transfer station 13 is readily accomplished because of the linear conveyor speed maintained equal to the tangential velocity of the chutes, and also because of the action of elements 190 and 192 which function to orient all the bottles in substantially the same position on conveyor 14.

It is also evident that the bottles are positively controlled from the time they are engaged by pusher heads 124, deposited in chutes 60, and transferred to conveyor 14, thereby insuring stabilization of the bottles.

Furthermore, the apparatus of the invention is readily adaptable to handle various sized and shaped bottles merely by adjusting the plate 77 according to the length of the bottle as described above and also by readjusting the position of plow 172 adjacent tracks 156.

Various modifications and additions to the above described embodiment may be employed without departing from the scope of the invention. For example, it is contemplated that a limit switch assembly may be positioned adjacent the path of rotation of pusher 120 and particularly cam roller 166 to shut off the machine if one of the pushers should become jammed in its uppermost position and fail to drop after it passes the discharge stations 152 and 154, thereby preventing any damage to the machine.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for orienting lightweight bottles comprising a hopper for holding randomly arranged bottles, rotatable discharge means including a plurality of chutes mounted adjacent said hopper and communicating therewith for receiving bottles therefrom by means whereby each bottle is introduced upright into a chute upper section, each of said chutes having upper and lower sections separated by a narrow space, a first stationary slide guide shelf extending laterally into said space for retaining upright bottles in said upper sections over a predetermined angular displacement of said rotatable discharge means, a second slide guide shelf adjacent the bottom of said lower chute section for receiving upright bottles therefrom, a conveyor positioned below said second shelf for receiving upright bottles therefrom, said shelves being of limited arcuate extent and arranged in overlapping relation whereby during rotation of said rotatable discharge means a bottle received from said hopper is retained in said upper chute section by said first stationary shelf, then discharged from an end of said first shelf into said lower chute section and onto said second shelf, temporarily retained in said lower chute section, and then transferred from an end of said second shelf onto said conveyor, and means for moving said conveyor at substantially the same speed as said lower chute sections.

2. An apparatus for orienting lightweight containers comprising a hopper for receiving and holding a plurality of randomly positioned containers, a driven rotatable drum positioned generally below the hopper, said drum having a plurality of peripheral chutes each having an upper part communicating with the hopper by means whereby each container is introduced into said upper part only in upright position and a lower discharge part aligned with said upper part and there being a space separating the lower end of said upper part from the upper end of said lower part, a first stationary shelf positioned adjacent to the drum and extending laterally into said space and having an upper slide surface cooperative with the chutes for retaining the upright containers in the upper parts of said chutes for a prescribed arc of rotation of the drum, said shelf being of predetermined arcuate extent less than 360° and terminating in a discharge end whereby the upright containers sliding along said surface drop directly into said lower parts of the chutes, a second stationary shelf of limited arcuate extent positioned below the lower ends of the lower chute parts and extending in overlapped relation to the discharge end of said first shelf to receive containers passing over the discharge end of said first shelf and down through said lower chute part, said second shelf slidably supporting containers in the lower parts of said chutes during drum rotation, a longitudinal conveyor positioned adjacent to a transfer station at an end of said second shelf and arranged substantially tangentially with respect to said drum for receiving containers from the lower parts of the chutes, and means for driving said conveyor at a speed which is substantially the same as the tangential speed of the lower parts of the chutes at the station where the containers are transferred to the conveyor.

* * * * *

UNITED STATES PATENT OFFICE
CERTIFICATE OF CORRECTION

PATENT NO. : 3,948,386
DATED : April 6, 1976
INVENTOR(S) : John C. Nalbach

It is certified that error appears in the above-identified patent and that said Letters Patent are hereby corrected as shown below:

Column 3, line 60, after "wall" insert --20--.

Column 3, lines 62-64, after "cone 20" delete --terminating at its lower end in annular plate 22, the upper surface of which is inclined to coincide with the slope of cone 20--.

Column 3, line 65, change "rooves" to --grooves--.

Signed and Sealed this

*twenty-ninth* Day of *June 1976*

[SEAL]

Attest:

RUTH C. MASON
*Attesting Officer*

C. MARSHALL DANN
*Commissioner of Patents and Trademarks*